(12) United States Patent
Shimogaki

(10) Patent No.: US 12,545,136 B2
(45) Date of Patent: Feb. 10, 2026

(54) VEHICLE

(71) Applicant: TOYOTA JIDOSHA KABUSHIKI KAISHA, Toyota (JP)

(72) Inventor: Yusuke Shimogaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 629 days.

(21) Appl. No.: 18/075,901

(22) Filed: Dec. 6, 2022

(65) Prior Publication Data

US 2023/0278447 A1    Sep. 7, 2023

(30) Foreign Application Priority Data

Mar. 1, 2022  (JP) .................. 2022-030846

(51) Int. Cl.
| | |
|---|---|
| *B60L 53/62* | (2019.01) |
| *B60L 53/14* | (2019.01) |
| *H02J 7/00* | (2006.01) |

(52) U.S. Cl.
CPC .............. *B60L 53/62* (2019.02); *B60L 53/14* (2019.02); *B60L 2240/549* (2013.01); *Y04S 10/126* (2013.01)

(58) Field of Classification Search
CPC .......... B60L 53/11; B60L 53/14; B60L 53/18; B60L 53/62; B60L 55/00; Y02T 90/14; H02J 7/0045; H02J 7/0047; Y04S 10/126
USPC ....................................................... 320/162
See application file for complete search history.

(56) References Cited

U.S. PATENT DOCUMENTS

| | | | | |
|---|---|---|---|---|
| 4,553,187 | A  * | 11/1985 | Burns .................. | H02H 3/0935 361/96 |
| 11,198,372 | B2 | 12/2021 | Niwa | |
| 2009/0096410 | A1* | 4/2009 | Sakurai .................. | B60L 58/20 320/109 |
| 2015/0115891 | A1* | 4/2015 | Sung ..................... | B60L 53/305 320/109 |

FOREIGN PATENT DOCUMENTS

JP        2014075297 A  *  4/2014

OTHER PUBLICATIONS

English Translation of JP2014075297A (Year: 2014).*

* cited by examiner

*Primary Examiner* — Julian D Huffman
*Assistant Examiner* — Ryu-Sung P. Weinmann
(74) *Attorney, Agent, or Firm* — Dinsmore & Shohl LLP

(57) ABSTRACT

A vehicle that supports rapid charge and normal charge and discharge includes an electrical load, a first power line, a second power line, a third power line, a first relay, a second relay, a first current sensor, a second current sensor, and an electronic control unit. The electronic control unit of the vehicle is configured to measure a current using a detection value from the second current sensor with the first relay controlled to an open state and with the second relay controlled to a closed state when the normal charge and discharge is executed. The electronic control unit is configured to measure a current using a detection value from the first current sensor with the first relay controlled to a closed state and with the second relay controlled to an open state when the rapid charge is executed.

6 Claims, 4 Drawing Sheets

VEHICLE

CROSS-REFERENCE TO RELATED APPLICATION

This application claims priority to Japanese Patent Application No. 2022-030846 filed on Mar. 1, 2022, incorporated herein by reference in its entirety.

BACKGROUND

1. Technical Field

The present disclosure relates to a vehicle configured to be able to charge and discharge an in-vehicle battery using power supplied from a power source outside the vehicle.

2. Description of Related Art

In recent years, there have been spread vehicles with an in-vehicle battery that can be externally charged using power supplied from a power source outside the vehicle, such as battery electric vehicles and plug-in hybrid electric vehicles. For example, Japanese Unexamined Patent Application Publication No. 2014-75297 (JP 2014-75297 A) discloses a vehicle configured to enable alternating current (AC) charge and direct current (DC) charge. This vehicle detects a charge current based on an output from a current sensor provided in a positive electrode line that connects between a positive electrode terminal of a main battery and a voltage boosting circuit (see JP 2014-75297 A).

Some vehicles that support DC charge support rapid charge, in which an in-vehicle battery is charged with power of predetermined power (e.g. 50 kW) or more received from a power source outside the vehicle. In vehicles that support rapid charge, the battery can be charged with large power, and thus the battery can be completely charged quickly.

SUMMARY

There have been developed techniques for using vehicles as power adjustment resources to perform peak shift and peak cut of system power etc. There have been developed vehicles that support these techniques, such as vehicles that support Vehicle to Home (V2H) in which power is supplied and received to and from a charge/discharge facility installed at home etc. and vehicles that support Vehicle to Grid (V2G) in which power is supplied and received to and from a power system, for example. Hereinafter, charge and discharge performed in V2H or V2G will also be referred to as "normal charge and discharge". It may be assumed that vehicles that support normal charge and discharge and that also support rapid charge will be further developed.

Power measurement during charge or discharge of the battery is occasionally performed by the vehicle. Power supplied and received during normal charge and discharge is normally less than power for rapid charge (i.e. less than predetermined power). During normal charge and discharge, power to be supplied and received is small, and therefore consumed power is not ignorable when an electrical load (auxiliary device) of the vehicle is driven during execution of normal charge and discharge. Therefore, the precision of power measurement during normal charge and discharge may be reduced in current measurement in which the current sensor 22 provided in the positive electrode line PL is used as in the vehicle disclosed in JP 2014-75297 A.

If a current sensor is provided in a charge line CPL branched from the positive electrode line PL in an attempt to measure currents for rapid charge and normal charge and discharge in the vehicle disclosed in JP 2014-75297 A, it is necessary to adopt a current sensor that can measure a current over a wide range. Adopting a current sensor that can measure a current over a wide range may incur a significant increase in cost.

The present disclosure provides a vehicle that supports rapid charge and normal charge and discharge. The vehicle charges a battery mounted on the vehicle in a short time by precisely performing power measurement during normal charge and discharge while suppressing an increase in cost.

This disclosure relates to a vehicle configured to be able to perform rapid charge, in which a battery is charged by receiving supply of power of predetermined power or more from a power facility via an inlet, and normal charge and discharge, in which the battery is charged and discharged by receiving and supplying power less than the predetermined power from and to the power facility via the inlet. This vehicle includes an electrical load, a first power line, a second power line, a first relay, a third power line, a second relay, a first current sensor, a second current sensor, and an electronic control unit. The first power line is configured to electrically connect between the battery and the electrical load. The second power line is configured to electrically connect between the inlet and the first power line. The first relay is provided in the second power line. The third power line is configured to electrically connect between the inlet and the first power line while bypassing the first relay. The second relay is provided in the third power line. The first current sensor is configured to detect a current that flows through the first power line between a connection point of the second power line and the battery. The second current sensor is configured to detect a current that flows through the third power line. The electronic control unit is configured to control the first relay and the second relay. The electronic control unit is configured to measure a current using a detection value from the first current sensor with the first relay controlled to a closed state and with the second relay controlled to an open state when the rapid charge is executed. The electronic control unit is configured to measure a current using a detection value from the second current sensor with the first relay controlled to an open state and with the second relay controlled to a closed state when the normal charge and discharge is executed.

With the vehicle according to the above aspect, power is supplied and received via the third power line with the first relay controlled to the open state and with the second relay controlled to the closed state when normal charge and discharge is executed. A current that flows through the third power line is measured as a current during normal charge and discharge using a detection value from the second current sensor. Consequently, a current can be measured precisely without being affected by power consumed by the electrical load, even if the electrical load is driven during execution of normal charge and discharge. Hence, power measurement can be performed precisely during normal charge and discharge. In addition, the third power line and the second current sensor are not used during rapid charge, and thus a power line and a sensor that support only normal charge and discharge can be adopted. Thus, an increase in cost can be suppressed compared to the case where a power line and a current sensor that support rapid charge and normal charge and discharge are added.

In the vehicle according to the above aspect, an allowable current value of the third power line may be less than an allowable current value of the second power line.

With the vehicle according to the above configuration, a power line with an allowable current value that is less than that of the second power line which supports rapid charge is used as the third power line which is provided as a path dedicated to normal charge and discharge. Consequently, a cost increase due to providing the third power line can be suppressed.

In the vehicle configured as described above, a rated current value of the second current sensor may be less than a rated current value of the first current sensor.

With the vehicle according to the above configuration, a current sensor with a rated current value that is less than that of the first current sensor which detects a current during rapid charge is used as the second current sensor which detects a current during normal charge and discharge. Consequently, a cost increase due to providing the second current sensor can be suppressed.

In the vehicle according to the above aspect, the electronic control unit may be configured to measure a current using the detection value from the second current sensor with the first relay controlled to the open state and with the second relay controlled to the closed state when available supply power of the power facility is limited to be less than the predetermined power, even in a case where the power facility supports the rapid charge.

When available supply power of the power facility is limited to be less than the predetermined power, power measurement may be affected by power consumed by the electrical load, as in normal charge and discharge. With the vehicle according to the above configuration, charge is performed via the third power line with the first relay controlled to the open state and with the second relay controlled to the closed state when available supply power of the power facility is limited to be less than the predetermined power, even when the power facility supports rapid charge. Consequently, a current can be measured precisely without being affected by power consumed by the electrical load, even if the electrical load is driven during execution of normal charge and discharge.

In the vehicle according to the above aspect, the electronic control unit may be configured to start the rapid charge with the first relay and a third relay controlled to the closed state and with the second relay controlled to the open state when the power facility does not support the normal charge and discharge.

With the vehicle according to the above configuration, the battery mounted on the vehicle can be charged in a short time by starting rapid charge by the power facility when the power facility does not support normal charge and discharge.

In the vehicle configured as described above, the electronic control unit may be configured to start the rapid charge with the first relay and a third relay controlled to the closed state and with the second relay controlled to the open state when an available output current value of the power facility is a threshold or more, in a case where the power facility does not support the normal charge and discharge.

With the vehicle according to the above configuration, the battery mounted on the vehicle can be charged in a short time by performing rapid charge upon confirming that the available output current value of the power facility is a threshold or more in consideration of whether the available output current value is the threshold or more, that is, with high reliability, when the power facility does not support normal charge and discharge.

In the vehicle according to the above aspect, the electronic control unit may be configured to start the rapid charge with the first relay and a third relay controlled to the closed state and with the second relay controlled to the open state when available supply power of the power facility is predetermined power or more, in a case where the power facility supports the normal charge and discharge.

With the vehicle according to the above configuration, the battery mounted on the vehicle can be charged in a short time by performing rapid charge upon confirming that the available supply power of the power facility is predetermined power or more in consideration of whether the available supply power is the predetermined power or more, that is, with high reliability, when the power facility supports normal charge and discharge.

With the vehicle according to the present disclosure, a battery mounted on a vehicle that supports rapid charge and normal charge and discharge can be charged in a short time by performing rapid charge when normal charge and discharge is not supported, by precisely performing power measurement during normal charge and discharge while suppressing an increase in cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figure 1:
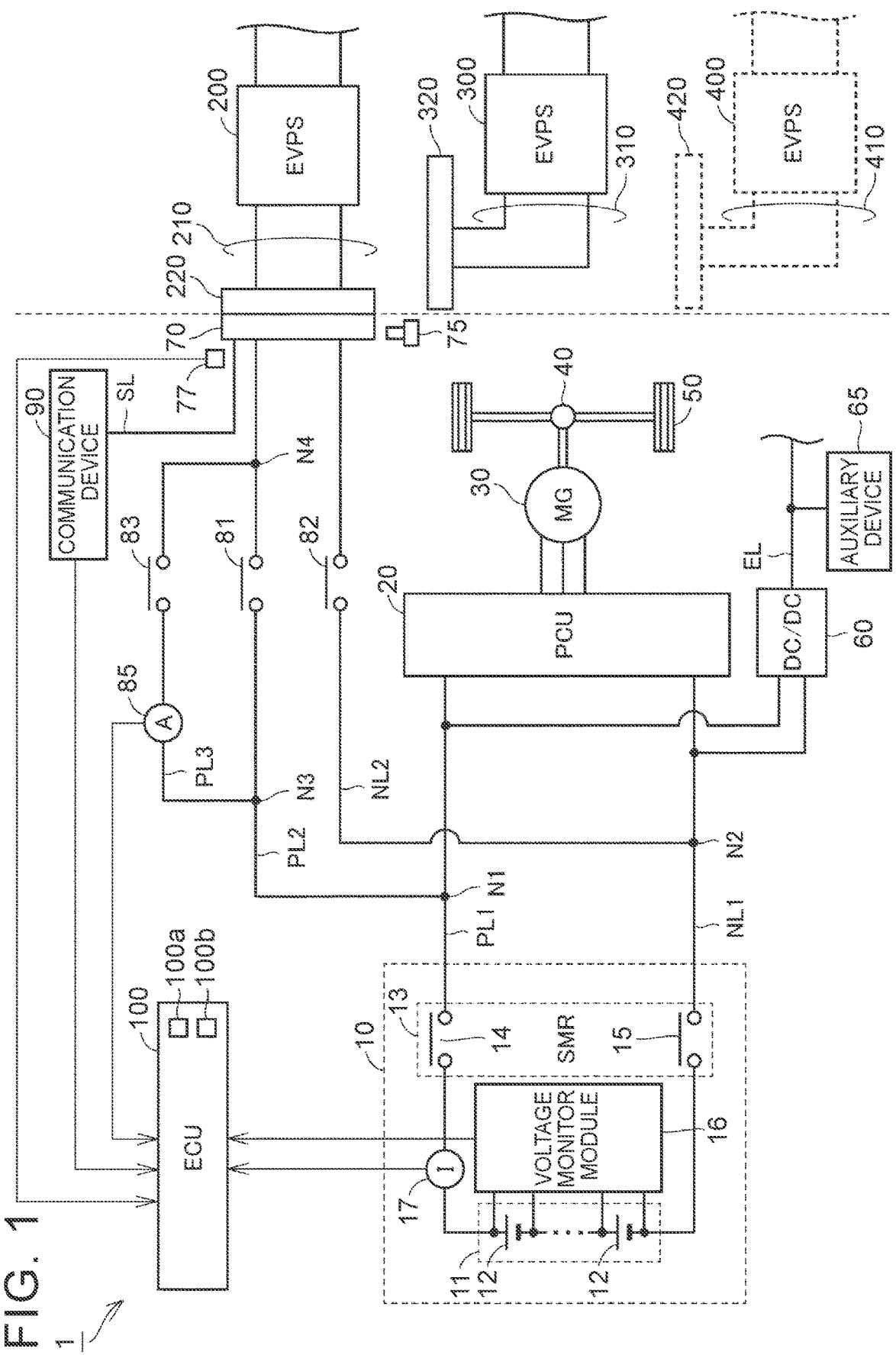
FIG. 1 illustrates an overall configuration of a vehicle according to an embodiment of the present disclosure.

First, the configuration of a vehicle 1 according to the embodiment will be described. FIG. 1 illustrates an overall configuration of the vehicle 1. The vehicle 1 is configured to be able to supply and receive power to and from an electric vehicle power system (EVPS) outside the vehicle. In the present embodiment, it is assumed that two power facilities, namely an EVPS 200 and an EVPS 300, are provided.

The EVPS 300 is a power facility for a vehicle of a direct current (DC) type for public or domestic use, for example. In the present embodiment, the EVPS 300 can perform rapid charge of the vehicle 1. The rapid charge refers to charging a battery 11 of the vehicle 1 by supplying power of predetermined power (e.g. 50 kW) or more from the EVPS 300 to the vehicle 1. The EVPS 300 and the vehicle 1 are connected to each other through a charge cable 310.

The EVPS 200 is a power facility for a vehicle of a DC type for public or domestic use, for example. In the present embodiment, the EVPS 200 can perform normal charge and discharge of the vehicle 1. Being able to perform the normal charge and discharge refers to being able to perform at least one of normal charge, in which the battery 11 of the vehicle 1 is charged by supplying power less than the predetermined power from the EVPS 200 to the vehicle 1, and normal discharge, in which the battery 11 of the vehicle 1 is discharged by supplying power less than the predetermined power from the vehicle 1 to the EVPS 200. The EVPS 200 and the vehicle 1 are connected to each other through a charge cable 210.

In the following description, reference signs are not given and the EVPSs are referred to simply as "EVPSs" when the EVPS 200 and the EVPS 300 are not particularly distinguished from each other.

The EVPS 200 receives alternating current (AC) power from a power system via power transmission lines, and converts the AC power into direct current (DC) power. Then, the EVPS 200 supplies the converted DC power to the vehicle 1 via the charge cable 210. In addition, the EVPS 200 receives DC power from the vehicle 1 via the charge cable 210, and converts the DC power into AC power. Then, the EVPS 200 supplies the converted AC power to the power system via the power transmission lines. The EVPS 300 receives AC power from a power system via power transmission lines, and converts the AC power into DC power. Then, the EVPS 300 supplies the converted DC power to the vehicle 1 via the charge cable 310.

The vehicle 1 according to the present embodiment is a battery electric vehicle (BEV) that supports rapid charge and normal charge and discharge. The vehicle 1 can be used for V2G and/or V2H, for example. It is only necessary that the vehicle 1 should be a vehicle configured to be capable of rapid charge and normal charge and discharge, and the vehicle 1 may be a plug-in hybrid electric vehicle (PHEV) or a plug-in fuel cell electric vehicle (PFCEV), for example.

The vehicle 1 includes a battery pack 10, a power control unit (hereinafter referred to also as "PCU") 20, a motor generator 30, a power transfer gear 40, drive wheels 50, a DC/DC converter 60, an auxiliary device 65 (which is an example of the "electrical load" according to the present disclosure), an inlet 70, a lock device 75, a voltage sensor 77, relays 81, 82, 83, a current sensor 85, a communication device 90, and an electronic control unit (ECU) 100.

The battery pack 10 and the PCU 20 are electrically connected to each other through power lines PL1, NL1. The battery pack 10 includes a battery 11, a system main relay (SMR) device 13, a voltage monitor module 16, and a current sensor 17.

The battery 11 is mounted on the vehicle 1 as a drive power source (i.e. a power source). The battery 11 is configured to include a plurality of batteries 12 stacked together. The batteries 12 are secondary batteries such as nickel metal hydride batteries or lithium-ion batteries, for example. The batteries 12 may be batteries that include a liquid electrolyte between a positive electrode and a negative electrode, or may be batteries (all-solid-state batteries) that include a solid electrolyte therebetween. It is only necessary that the battery 11 should be a rechargeable DC power source, and the battery 11 may be a high-capacity capacitor.

The system main relay device 13 is provided in the power lines PL1, NL1 that electrically connect between the battery 11 and the PCU 20. The system main relay device 13 includes SMRs 14, 15. One end of the SMR 14 is electrically connected to the positive electrode terminal of the battery 11, and the other end thereof is electrically connected to the PCU 20. One end of the SMR 15 is electrically connected to the negative electrode terminal of the battery 11, and the other end thereof is electrically connected to the PCU 20.

The voltage monitor module 16 detects the voltage of each of the plurality of batteries 12 included in the battery 11, and outputs a signal that indicates the detection result to the ECU 100. The voltage monitor module 16 may detect the voltage between the terminals of the battery 11, and output a signal that indicates the detection result to the ECU 100.

The current sensor 17 is provided between the positive electrode terminal of the battery 11 and the SMR 14, and detects a current input to and output from the battery 11. That is, the current sensor 17 detects a current that flows through the power line PL1 between the positive electrode terminal of the battery 11 and the SMR 14. The current sensor 17 outputs a signal that indicates the detection result to the ECU 100. The current sensor 17 is selected on the assumption that the current sensor 17 detects a current that flows during rapid charge. That is, the current sensor 17 has a current measurement range, a rated current value, and reliability that match a current that may be input to the battery 11 during execution of rapid charge supported by the vehicle 1. The rated current value of the current sensor 17 is larger than the rated current value of the current sensor 85 that detects a current that flows during normal charge and discharge. For example, the current sensor 17 may be a sensor with a core with a rated current value of several hundreds of amperes or several kiloamperes.

The PCU 20 collectively indicates a power conversion device that receives power from the battery pack 10 (battery 11) and drives the motor generator 30. For example, the PCU 20 includes an inverter that drives the motor generator 30, a converter that boosts power output from the battery 11 and supplies the boosted power to the inverter, etc.

The motor generator 30 is an AC rotary electric machine, and may be a permanent magnet synchronous motor that includes a rotor in which permanent magnets are embedded, for example. The rotor of the motor generator 30 is mechanically connected to the drive wheels 50 via the power transfer gear 40. The motor generator 30 generates kinetic energy for driving the vehicle 1 by receiving AC power from the PCU 20. The kinetic energy generated by the motor generator 30 is transferred to the power transfer gear 40. When the vehicle 1 is to be decelerated or to be stopped, on the other hand, the motor generator 30 converts the kinetic energy of the vehicle 1 into electrical energy. The AC power generated by the motor generator 30 is converted into DC power by the PCU 20, and supplied to the battery 11. Consequently, regenerative power can be stored in the battery 11. In this manner, the motor generator 30 is configured to generate a drive force or a braking force for the vehicle 1 as supplying and receiving power to and from the battery 11 (i.e. charge and discharge of the battery 11).

When the vehicle 1 is configured as a plug-in hybrid electric vehicle on which an engine (not illustrated) is further mounted as a power source, an output from the engine also can be used as a drive force for travel in addition to an output from the motor generator 30. Alternatively, a motor generator (not illustrated) that generates power using an output from the engine may be further mounted to generate power for charging the battery 11 using the output from the engine.

The DC/DC converter 60 is electrically connected between the power lines PL1, NL1 and a power line EL. The DC/DC converter 60 reduces the voltage between the power lines PL1, NL1, and supplies the reduced voltage to the power line EL. The DC/DC converter 60 operates in accordance with a control signal from the ECU 100.

The auxiliary device 65 is electrically connected to the power line EL. The auxiliary device 65 includes an illumination device, an audio device, a navigation device, a headlight system, a wiper device, a power steering device, etc., for example.

The inlet 70 is configured to be connectable with a connector 220 provided at the distal end of the charge cable 210 of the EVPS 200 and a connector 320 provided at the distal end of the charge cable 310 of the EVPS 300.

The lock device 75 is provided in the vicinity of the inlet 70. The lock device 75 is configured to be switchable between a locked state, in which insertion and extraction of the connectors 220, 320 (charge cables 210, 310) to be connected to the inlet 70 are regulated, and an unlocked state, in which insertion and extraction of the connectors 220, 320 to be connected to the inlet 70 is enabled.

The voltage sensor 77 detects a voltage applied to the inlet 70, and outputs a signal that indicates the detection result to the ECU 100.

The relay 81 is provided in a power line PL2 that electrically connects between a node N1 on the power line PL1 between the SMR 14 and the PCU 20 and the inlet 70. The relay 81 is switched between an open state and a closed state in accordance with a control signal from the ECU 100. The ECU 100 switches electrical connection and disconnection between the inlet 70 and the power line PL1 by switching the relay 81 between the open state and the closed state.

The relay 82 is provided in a power line NL2 that electrically connects between a node N2 on the power line NL1 between the SMR 15 and the PCU 20 and the inlet 70. The relay 82 is switched between an open state and a closed state in accordance with a control signal from the ECU 100. The ECU 100 switches electrical connection and disconnection between the inlet 70 and the power line NL1 by switching the relay 82 between the open state and the closed state.

The relay 83 is provided in a power line PL3 that electrically connects between the inlet 70 and the power line PL1 while bypassing the relay 81. The power line PL3 electrically connects between a node N3 on the power line PL2 between the node N1 and the relay 81 and a node N4 on the power line PL2 between the relay 81 and the inlet 70. One end of the relay 83 is electrically connected to the node N3, and the other end thereof is electrically connected to the node N4. The relay 83 is switched between an open state and a closed state in accordance with a control signal from the ECU 100. It is only necessary that the power line PL3 should be able to form a path that can electrically connect between the inlet 70 and the power line PL1 not via the relay 81, and the power line PL3 is not limited to being provided to electrically connect between the nodes N3 and N4. For example, one end of the power line PL3 may be electrically connected to a node on the power line PL1 between the SMR 14 and the PCU 20, and the other end thereof may be electrically connected to the inlet 70.

The power line PL3 is selected on the assumption that the power line PL3 is used during normal charge and discharge. The power line PL3 has an allowable current value that matches a current that may flow through the power line PL3 during execution of normal charge and discharge. The allowable current value of the power line PL3 is less than the allowable current value of the power line PL2. That is, the diameter of the power line PL3 is less than the diameter of the power line PL2. Therefore, a relatively small space is required for wiring of the power line PL3. The power line PL2 is selected on the assumption that the power line PL2 is used during rapid charge.

The current sensor 85 is provided in the power line PL3 between the node N3 and the relay 83. The current sensor 85 detects a current that flows through the power line PL3, and outputs a signal that indicates the detection result to the ECU 100. The current sensor 85 is selected on the assumption that the current sensor 85 detects a current that flows during normal charge and discharge. That is, the current sensor 85 has a current measurement range, a rated current value, and reliability that match a current that may flow through the power line PL3 during execution of normal charge and discharge supported by the vehicle 1. The rated current value of the current sensor 85 is smaller than the rated current value of the current sensor 17 that detects a current that flows during rapid charge. For example, the current sensor 85 may be a coreless sensor with a rated current value of several tens of amperes.

The communication device 90 is configured to be able to communicate with the EVPS 200 electrically connected to the inlet 70 via a communication signal line SL and the charge cable 210. The communication device 90 is also configured to be able to communicate with the EVPS 300 electrically connected to the inlet 70 via the communication signal line SL and the charge cable 310. Communication between the communication device 90 (vehicle 1) and the EVPS 200 and the EVPS 300 is performed through communication (hereinafter referred to also as "CAN communication") made in accordance with a controller area network (CAN) communication protocol. Communication between the communication device 90 (vehicle 1) and the EVPS 200 and the EVPS 300 is not limited to CAN communication, and may be performed through power line communication (PLC), for example.

The ECU 100 includes a central processing unit (CPU) 100a, a memory 100b, and an input/output buffer (not illustrated), and receives signals input from the sensors etc., outputs a control signal to the various devices, and controls the various devices. Such control is not limited to software processing, and can also be processed by dedicated hardware (electronic circuits).

The memory 100b of the ECU 100 stores in advance information about charge and discharge of the battery 11, such as a charge voltage lower limit value, a charge voltage upper limit value, a lowest charge current value, a discharge current upper limit value, and a discharge voltage lower limit value. The charge voltage lower limit value is the lower limit value of a voltage that can be applied to the battery 11 during charge of the battery 11. The charge voltage upper limit value is the upper limit value of a voltage that can be applied to the battery 11 during charge of the battery 11. The lowest charge current value is the lower limit value of a charge current during charge of the battery 11. The discharge current upper limit value is the upper limit value of a discharge current during discharge of the battery 11. The discharge voltage lower limit value is the lower limit value of a voltage between the terminals allowed during discharge of the battery 11. The charge voltage lower limit value, the charge voltage upper limit value, the lowest charge current value, the discharge current upper limit value, and the discharge voltage lower limit value are determined based on the specifications of the battery 11, for example.

The ECU 100 controls the open/closed state of the system main relay device 13 and the relays 81, 82, 83.

The ECU 100 controls various portions of the vehicle 1, and controls rapid charge and normal charge and discharge. The ECU 100 measures charge power or discharge power during execution of rapid charge and/or normal charge and discharge.

When rapid charge is executed, the ECU 100 charges the battery 11 via the power lines PL2, NL2 with the relays 81, 82 brought into the closed state. The ECU 100 brings the relay 83 into the open state when rapid charge is executed. The ECU 100 measures a charge current based on a detection value from the current sensor 17. The ECU 100 measures charge power during rapid charge based on a detection value from the voltage sensor 77 and a detection value from the current sensor 17. Charge power during rapid charge can also be measured by the EVPS 300, for example.

When normal charge and discharge is executed, the ECU 100 charges or discharges the battery 11 via the power lines PL3, NL2 with the relays 82, 83 brought into the closed state. The power line PL3 is, so to speak, a dedicated charge/discharge path for executing normal charge and discharge. The ECU 100 measures a charge current or a discharge current based on a detection value from the current sensor 85. The ECU 100 measures charge power and discharge power during normal charge and discharge based on a detection value from the voltage sensor 77 and a detection value from the current sensor 85.

The auxiliary device 65 is occasionally driven by using the vehicle 1 in a my room mode etc. during execution of rapid charge and normal charge and discharge. A part of power supplied to the vehicle 1 is consumed by the auxiliary device 65 during charge, and a part of power taken from the battery 11 is consumed by the auxiliary device 65 during discharge, for example. The power consumed by the auxiliary device 65 is so small as to be ignorable compared to charge power during rapid charge. On the other hand, the power consumed by the auxiliary device 65 is not ignorable compared to power (charge power or discharge power) during normal charge and discharge.

In the present embodiment, as discussed above, the charge/discharge path (power line PL3) dedicated to normal charge and discharge and the current sensor 85 are provided to enable power measurement without being affected by the power consumed by the auxiliary device 65. Hence, the precision of power measurement during normal charge and discharge can be improved.

By using the power line PL3 as a charge/discharge path dedicated to normal charge and discharge, it is only necessary to add a power line that has an allowable current value that supports normal charge and discharge. Hence, an increase in cost due to providing a charge/discharge path dedicated to normal charge and discharge can be suppressed. By providing a charge/discharge path dedicated to normal charge and discharge, the current sensor 85 that supports normal charge and discharge can be adopted as a current sensor that detects a current that flows through the power line PL3. It is possible to suppress an increase in cost compared to the case where a charge/discharge path dedicated to normal charge and discharge is not provided and a wide-range current sensor is provided in the power line PL2.

Figure 2:
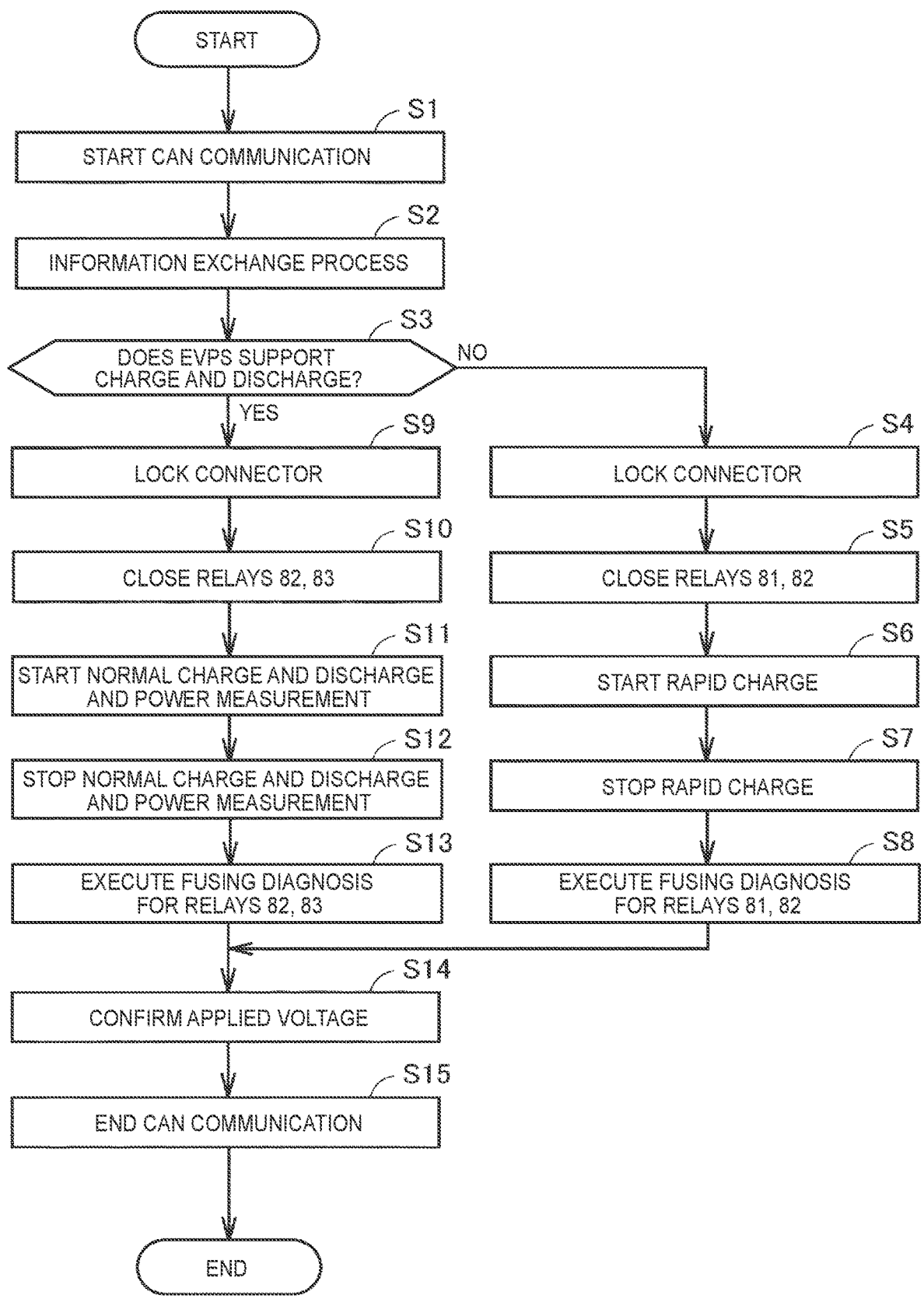
FIG. 2 is a flowchart illustrating the procedures for a process related to rapid charge and normal charge and discharge of the vehicle.

FIG. 2 is a flowchart illustrating the procedures for a process related to rapid charge and normal charge and discharge. This flowchart is started by the ECU 100 when a start operation is performed with the connector 220 of the charge cable 210 or the connector 320 of the charge cable 310 connected to the inlet 70. The start operation may be an operation on an operation button (not illustrated) provided on the EVPS 200 or the EVPS 300 to start normal charge and discharge or rapid charge, for example. The start operation may be an operation on an operation button displayed on a display screen of the navigation device of the vehicle 1, for example. While each step (hereinafter abbreviated as "S") in the flowcharts in FIG. 2 and FIGS. 3 and 4 to be discussed later is described as being implemented through software processing by the ECU 100, some or all of the steps may be implemented by hardware (electronic circuits) fabricated in the ECU 100.

In S1, the ECU 100 starts CAN communication with an EVPS via the communication device 90 in response to a start operation being performed.

In S2, the ECU 100 executes a process of exchanging information with the EVPS before start of charge. Specifically, the ECU 100 transmits information about charge and discharge of the battery 11, including the charge voltage lower limit value, the charge voltage upper limit value, the lowest charge current value, the discharge current upper limit value, and the discharge voltage lower limit value, to the EVPS via the communication device 90. On the other hand, the ECU 100 acquires information about the EVPS, such as an available output voltage value, an available output current value, and a discharge support flag, from the EVPS via the communication device 90. The available output voltage value indicates the maximum output voltage of the EVPS. The available output current value indicates the maximum output current of the EVPS. The discharge support flag indicates whether the EVPS supports discharge. For example, the discharge support flag indicates a value of "1" when the EVPS supports discharge. The discharge support flag indicates a value of "0" when the EVPS does not support discharge.

In S3, the ECU 100 determines whether the EVPS electrically connected to the inlet 70 supports charge and discharge. Specifically, the ECU 100 determines whether the EVPS electrically connected to the inlet 70 supports charge and discharge based on the discharge support flag received from the EVPS in the information exchange process in S2. When the discharge support flag indicates a value of 0, the ECU 100 determines that the EVPS supports only charge (does not support discharge), and that the EVPS 300 is electrically connected to the inlet 70. When the discharge support flag indicates a value of 1, the ECU 100 determines that the EVPS supports charge and discharge, and that the EVPS 200 is electrically connected to the inlet 70. When it is determined that the EVPS does not support charge and discharge (NO in S3), the ECU 100 proceeds to S4. When it is determined that the EVPS supports charge and discharge (YES in S3), the ECU 100 proceeds to S9.

In S4, the ECU 100 switches the lock device 75 from the unlocked state to the locked state. Consequently, insertion and extraction of the connector 320 of the charge cable 310 to and from the inlet 70 are regulated.

In S5, the ECU 100 brings the relays 81, 82 into the closed state. In this case, the ECU 100 keeps the relay 83 in the open state.

In S6, the ECU 100 starts rapid charge. The charge power during rapid charge may be measured by the ECU 100, or may be measured by the EVPS 300, based on detection values from the voltage sensor 77 and the current sensor 17.

In S7, the ECU 100 stops rapid charge as a condition to end rapid charge is met. The condition to end rapid charge may be a condition to be met when the battery 11 is fully charged, a condition to be met when the state of charge (SOC) of the battery 11 is brought to an SOC set in advance, a condition to be met when a charge time determined in advance has elapsed since rapid charge is started, etc., for example.

In S8, the ECU 100 executes a fusing diagnosis for the relays 81, 82. For example, the ECU 100 controls an output voltage from the EVPS 300 to a threshold voltage or less (e.g. zero), and brings the SMRs 14, 15 into the closed state. Then, the ECU 100 brings both the relays 81, 82 into the open state, and determines whether a detection value from the voltage sensor 77 is a threshold voltage or less. When the detection value from the voltage sensor 77 is not the threshold voltage or less, the ECU 100 determines that the contact points of both the relays 81, 82 have been fused. Then, the ECU 100 brings the relay 81 into the open state and brings the relay 82 into the closed state, and determines whether the detection value from the voltage sensor 77 is the threshold voltage or less. When the detection value from the voltage sensor 77 is not the threshold voltage or less, the ECU 100 determines that the contact point of the relay 81 has been fused. The ECU 100 brings the relay 81 into the closed state and brings the relay 82 into the open state, and determines whether the detection value from the voltage sensor 77 is the threshold voltage or less. When the detection value from the voltage sensor 77 is not the threshold voltage or less, the ECU 100 determines that the contact point of the relay 82 has been fused. When it is determined in the fusing diagnosis that at least one of the contact points of the relays 81, 82 has been fused, the ECU 100 may cause the display screen of the navigation device included in the auxiliary device 65 etc. to display a warning, or cause the navigation device to issue a voice warning, for example. When the fusing diagnosis is finished, the ECU 100 brings the SMRs 14, 15 into the open state, and proceeds to S14.

In S9, the ECU 100 switches the lock device 75 from the unlocked state to the locked state. Consequently, insertion and extraction of the connector 220 of the charge cable 210 to and from the inlet 70 are regulated.

In S10, the ECU 100 brings the relays 82, 83 into the closed state. In this case, the ECU 100 keeps the relay 81 in the open state.

In S11, the ECU 100 starts normal charge and discharge (charge or discharge). As normal charge and discharge is started, the ECU 100 starts measurement of charge power or discharge power based on a detection value from the current sensor 85 and a detection value from the voltage sensor 77.

In S12, the ECU 100 stops normal charge and discharge as a condition to end normal charge and discharge is met. The condition to end normal charge may be a condition to be met when the battery 11 is fully charged, a condition to be met when the SOC of the battery 11 is brought to an SOC set in advance, a condition to be met when a charge time determined in advance has elapsed since normal charge is started, etc., for example. The condition to end normal discharge may be a condition to be met when the SOC of the battery 11 is reduced to a lower limit SOC, a condition to be met when the SOC of the battery 11 is reduced to an SOC set in advance, a condition to be met when a discharge time determined in advance has elapsed since normal discharge is started, etc., for example. The ECU 100 stops normal charge and discharge, and stops measurement of charge power or discharge power.

In S13, the ECU 100 executes a fusing diagnosis for the relays 82, 83. The method of the fusing diagnosis for the relays 82, 83 may be the same as the method described in relation to S8. When the fusing diagnosis is finished, the ECU 100 brings the SMRs 14, into the open state, and proceeds to S14.

In S14, the ECU 100 confirms based on a detection value from the voltage sensor 77 that a voltage applied from the EVPS to the inlet 70 is zero.

In S15, the ECU 100 ends the CAN communication, and ends the process in this flowchart.

In the vehicle 1 according to the present embodiment, as described above, the ECU 100 charges the battery 11 via the power lines PL2, NL2 with the relays 81, 82 brought into the closed state when rapid charge is executed. When normal charge and discharge is executed, on the other hand, the ECU 100 charges or discharges the battery 11 via the power lines PL3, NL2 with the relays 82, 83 brought into the closed state. During normal charge and discharge, the ECU 100 measures a charge current and a discharge current based on a detection value from the current sensor 85, and measures charge power and discharge power based on a detection value from the voltage sensor 77 and a detection value from the current sensor 85. Power measurement can be performed without being affected by power consumed by the auxiliary device 65, by providing a dedicated charge/discharge path (power line PL3) for executing normal charge and discharge and the current sensor 85. Hence, the precision in power measurement during normal charge and discharge can be improved.

By using the power line PL3 as a charge/discharge path dedicated to normal charge and discharge, it is only necessary to add a power line that has an allowable current value that supports normal charge and discharge. Hence, an increase in cost due to providing a charge/discharge path dedicated to normal charge and discharge can be suppressed.

By providing a charge/discharge path dedicated to normal charge and discharge, the current sensor 85 that supports normal charge and discharge can be adopted as a current sensor that detects a current that flows through the power line PL3. It is possible to suppress an increase in cost compared to the case where a charge/discharge path dedicated to normal charge and discharge is not provided and a wide-range current sensor is provided in the power line PL2.

Next, a first modification of the present embodiment will be described. In the present embodiment, when the EVPS 300 that supports rapid charge is electrically connected to the inlet 70, the battery 11 is charged via the power lines PL2, NL2 with the relays 81, 82 brought into the closed state. However, a charge current for the EVPS 300 may be limited because of a reduction in system voltage etc., for example. When the charge current is limited, power that can be supplied from the EVPS 300 to the vehicle 1 may be less than predetermined power. In other words, the EVPS 300 may only be able to supply the vehicle 1 with power that is equivalent to charge during normal charge and discharge because of the limitation on the charge current. In such a case, measurement of charge power may be affected by power consumed by the auxiliary device 65 as in normal charge and discharge. Thus, when power that can be supplied from the EVPS 300 to the vehicle 1 is less than predetermined power, the ECU 100 charges the battery 11 via the power lines PL3, NL2 with the relays 82, 83 brought into the closed state.

Figure 3:
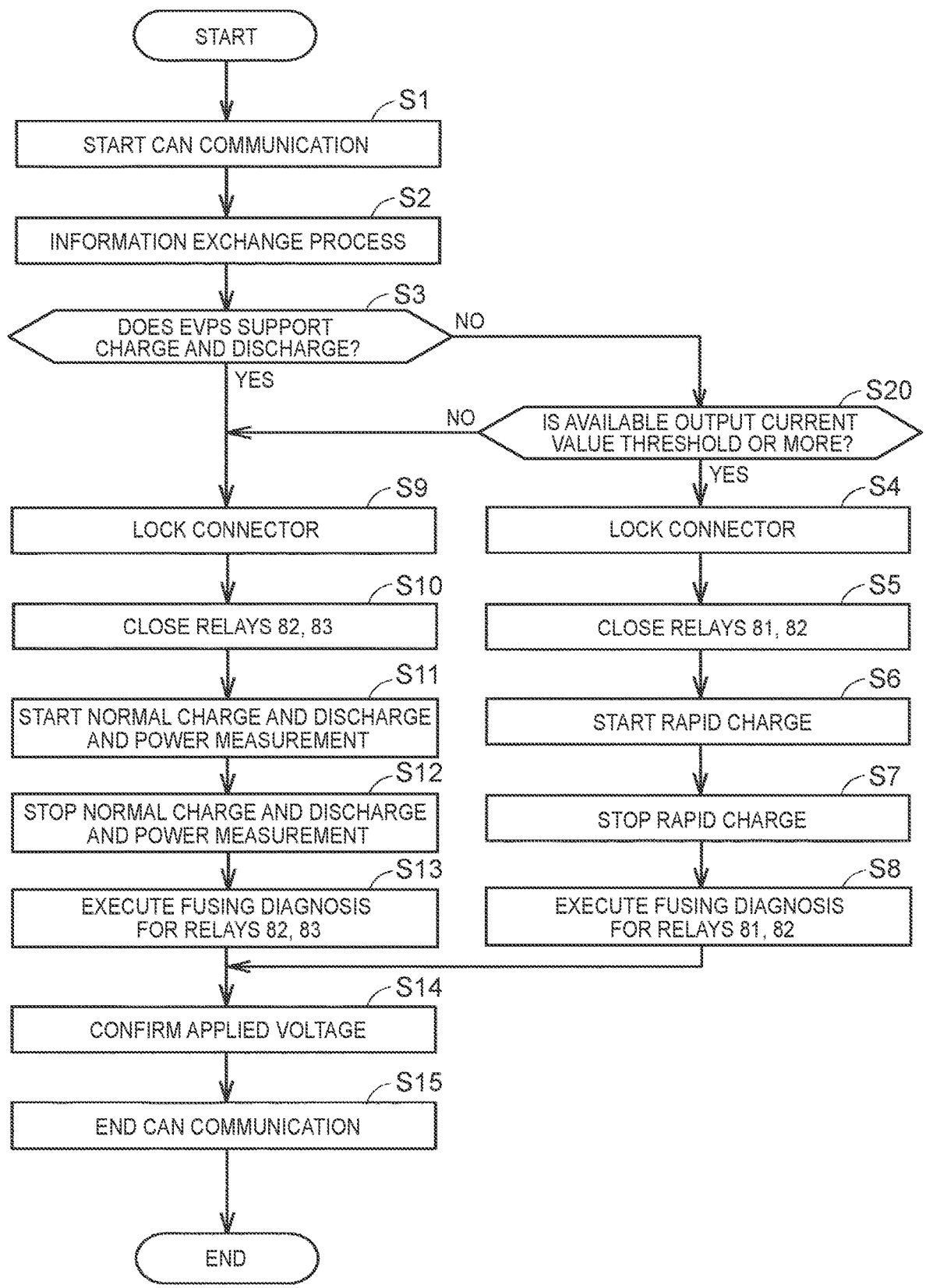
FIG. 3 is a flowchart illustrating the procedures for a process related to rapid charge and normal charge and discharge according to a first modification of the embodiment.

FIG. 3 is a flowchart illustrating the procedures for a process related to rapid charge and normal charge and discharge according to the first modification. The process in the flowchart in FIG. 3 is started by the ECU 100 when a start operation is performed with the connector 220 of the charge cable 210 or the connector 320 of the charge cable 310 connected to the inlet 70, as in the present embodiment. The flowchart in FIG. 3 is obtained by adding the process in S20 to the flowchart in FIG. 2. The processes in the flowchart in FIG. 3 other than S20 are the same as those in the flowchart in FIG. 2, and therefore are denoted by the same signs and description thereof will not be repeated.

When it is determined in S3 that the EVPS does not support charge and discharge (NO in S3), that is, when it is determined that the EVPS 300 is electrically connected to the inlet 70, the ECU 100 proceeds to S20.

In S20, the ECU 100 determines whether an available output current value from the EVPS 300 is a threshold or more. The available output current value has been acquired from the EVPS 300 in the information exchange process in S2. The memory 100*b* of the ECU 100 stores a threshold for rapid charge in advance. The threshold is a value for determining whether a charge current is limited during rapid charge. A plurality of thresholds may be prepared for each voltage, for example. In this case, the ECU 100 selects a threshold to be used currently among the plurality of thresholds based on the available output voltage value from the EVPS 300. When it is determined that the available output current value is the threshold or more (YES in S20), the ECU 100 proceeds to S4. When it is determined that the available output current value is less than the threshold (NO in S20), the ECU 100 proceeds to S9.

Consequently, when the available output current value from the EVPS 300 is less than the threshold, the ECU 100 measures charge power based on a detection value from the current sensor 85 and a detection value from the voltage sensor 77 in S11.

It may be determined whether available supply power computed from an available output current value and an available output voltage value is predetermined power or more, in place of the process in S20. When it is determined that the available supply power is the predetermined power or more (YES in S20), the ECU 100 proceeds to S4. When it is determined that the available supply power is less than the predetermined power (NO in S20), the ECU 100 proceeds to S9.

As described above, the battery 11 is charged via the power lines PL3, NL2 with the relays 82, 83 brought into the closed state, as in normal charge and discharge, when the available supply power is limited to be less than the predetermined power, even when the EVPS 300 is electrically connected to the inlet 70. Consequently, power measurement can be performed without being affected by power consumed by the auxiliary device 65.

Next, a second modification of the present embodiment will be described. In the present embodiment, the EVPS 200 supports normal charge and discharge, and the EVPS 300 supports rapid charge. However, there may be an EVPS that supports both normal charge and discharge and rapid charge.

While referring again to FIG. 1, an EVPS 400 is a power facility for a vehicle of a DC type for public or domestic use, for example. The EVPS 400 is capable of normal charge and discharge and rapid charge. The EVPS 400 and the vehicle 1 are connected to each other through a charge cable 410. A connector 420 provided at the distal end of the charge cable 410 is configured to be connectable to the inlet 70 of the vehicle 1.

The EVPS 400 receives AC power from a power system via power transmission lines, and converts the AC power into DC power. Then, the EVPS 400 supplies the converted DC power to the vehicle 1 via the charge cable 410. In addition, the EVPS 400 receives DC power from the vehicle 1 via the charge cable 410, and converts the DC power into AC power. Then, the EVPS 400 supplies the converted AC power to the power system via the power transmission lines.

For charge, the EVPS 400 is configured to be able to execute rapid charge or normal charge based on a choice by a user. When the user selects rapid charge, the EVPS 400 supplies the vehicle 1 with power of predetermined power or more. When the user selects normal charge, the EVPS 400 supplies the vehicle 1 with power less than the predetermined power. The user can select one of rapid charge and normal charge by operating an operation panel (not illustrated) of the EVPS 400, for example. The EVPS 400 may be configured to be able to select one of rapid charge and normal charge by operating the navigation device of the vehicle 1, for example. In this case, the choice by the user is transferred from the vehicle 1 to the EVPS 400 via the charge cable 410.

When rapid charge is selected, the EVPS 400 transmits an available output voltage value and an available output current value for rapid charge to the vehicle 1 in a process of exchanging information with the vehicle 1. The vehicle 1 can determine whether rapid charge is selected or normal charge is selected by computing available supply power from the EVPS 400 based on an available output voltage value and an available output current value.

Figure 4:
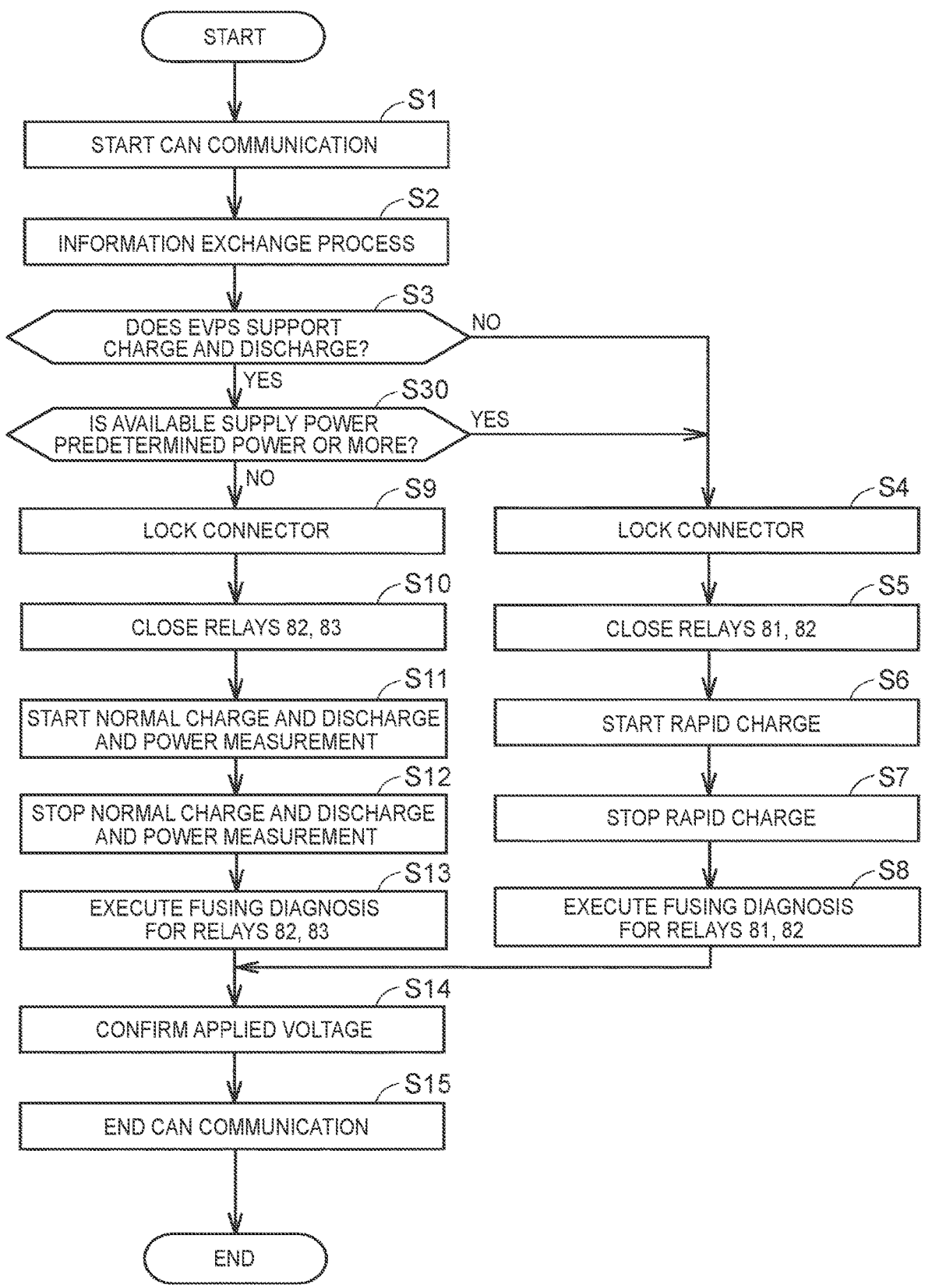
FIG. 4 is a flowchart illustrating the procedures for a process related to rapid charge and normal charge and discharge according to a second modification of the embodiment.

FIG. 4 is a flowchart illustrating the procedures for a process related to rapid charge and normal charge and discharge according to the second modification. The process in the flowchart in FIG. 4 is started by the ECU 100 when a start operation is performed with any of the connectors 220, 320, 420 connected to the inlet 70, as in the present embodiment. The flowchart in FIG. 4 is obtained by adding the process in S30 to the flowchart in FIG. 2. The processes in the flowchart in FIG. 4 other than S30 are the same as those in the flowchart in FIG. 2, and therefore are denoted by the same signs and description thereof will not be repeated.

When it is determined in S3 that the EVPS supports charge and discharge (YES in S3), that is, when it is determined that the EVPS 200 or the EVPS 400 is electrically connected to the inlet 70, the ECU 100 proceeds to S30.

In S30, the ECU 100 determines, based on the available output voltage value and the available output current value acquired in S2, whether available supply power from the EVPS is predetermined power or more. When the available supply power from the EVPS is the predetermined power or more, it can be determined that the EVPS 400 is electrically connected to the inlet 70, and that the user selects to execute rapid charge. Thus, when the available supply power from the EVPS is the predetermined power or more (YES in S30), the ECU 100 proceeds to S4. Consequently, the battery 11 is charged via the power lines PL2, NL2 with the relays 81, 82 brought into the closed state in rapid charge.

When the available supply power from the EVPS is less than the predetermined power, on the other hand, it can be determined that the EVPS 200 is electrically connected to the inlet 70, or that the EVPS 400 is electrically connected to the inlet 70 and the user selects to execute normal charge. Thus, when the available supply power from the EVPS is less than predetermined power (NO in S30), the ECU 100 proceeds to S9. Consequently, the battery 11 is charged or discharged via the power lines PL3, NL2 with the relays 82, 83 brought into the closed state in normal charge and discharge.

As described above, the charge/discharge path can be selected appropriately in accordance with which of rapid charge and normal charge and discharge is selected, even when the EVPS 400 that supports both normal charge and discharge and rapid charge is used.

The second modification can be combined with the first modification discussed above.

The embodiment disclosed herein should be construed as illustrative in all respects and not limiting. The scope of the present disclosure is indicated by the claims rather than by the above description of the embodiment, and is intended to include all modifications that fall within the meaning and the scope equivalent to those of the claims.

What is claimed is:

1. A vehicle configured to be able to perform rapid charge, in which a battery is charged by receiving supply of power of predetermined power or more from a power facility via an inlet, and normal charge and discharge, in which the battery is charged and discharged by receiving and supplying power less than the predetermined power from and to the power facility via the inlet, the vehicle comprising:
   an electrical load;
   a first power line configured to electrically connect between the battery and the electrical load;
   a second power line configured to electrically connect between the inlet and the first power line;
   a first relay provided in the second power line;
   a third power line configured to electrically connect between the inlet and the first power line while bypassing the first relay;
   a second relay provided in the third power line;
   a first current sensor configured to detect a current that flows through the first power line between a connection point of the second power line and the battery;
   a second current sensor configured to detect a current that flows through the third power line; and
   an electronic control unit configured to control the first relay and the second relay,
   wherein the electronic control unit is configured to measure a current using a detection value from the first current sensor with the first relay controlled to a closed state and with the second relay controlled to an open state when the rapid charge is executed,
   wherein the electronic control unit is configured to measure a current using a detection value from the second current sensor with the first relay controlled to an open state and with the second relay controlled to a closed state when the normal charge and discharge is executed, and
   wherein the electronic control unit is configured to start the rapid charge with the first relay and a third relay controlled to the closed state and with the second relay controlled to the open state when the power facility does not support the normal charge and discharge.

2. The vehicle according to claim 1, wherein an allowable current value of the third power line is less than an allowable current value of the second power line.

3. The vehicle according to claim 2, wherein a rated current value of the second current sensor is less than a rated current value of the first current sensor.

4. The vehicle according to claim 1, wherein the electronic control unit is configured to measure a current using the detection value from the second current sensor with the first relay controlled to the open state and with the second relay controlled to the closed state when available supply power of the power facility is limited to be less than the predetermined power, even in a case where the power facility supports the rapid charge.

5. The vehicle according to claim 1, wherein the electronic control unit is configured to start the rapid charge with the first relay and the third relay controlled to the closed state and with the second relay controlled to the open state when an available output current value of the power facility is equal to or greater than a threshold, in a case where the power facility does not support the normal charge and discharge.

6. The vehicle according to claim 1, wherein the electronic control unit is configured to start the rapid charge with the first relay and the third relay controlled to the closed state and with the second relay controlled to the open state when available supply power of the power facility is equal to or greater than a predetermined power, in a case where the power facility supports the normal charge and discharge.

* * * * *